US010260622B2

(12) United States Patent
Richter et al.

(10) Patent No.: US 10,260,622 B2
(45) Date of Patent: Apr. 16, 2019

(54) TRANSMISSION ARRANGEMENT AND ELECTRIC MACHINE FOR MOTOR VEHICLE AND TEMPERATURE DETECTION METHOD THEREFOR

(71) Applicant: GETRAG B.V. & Co. KG, Untergruppenbach (DE)

(72) Inventors: Ralph Richter, St. Georgen (DE); Jan Gurrath, Heilbronn (DE); Michael Ludwig, Sinsheim (DE); Marc Weinert, Neckarwestheim (DE); Hans-Peter Moosmann, Schramberg (DE)

(73) Assignee: GETRAG B.V. & Co. KG, Untergruppenbach (DE)

( * ) Notice: Subject to any disclaimer, the term of this patent is extended or adjusted under 35 U.S.C. 154(b) by 0 days.

(21) Appl. No.: 15/877,890

(22) Filed: Jan. 23, 2018

(65) Prior Publication Data
US 2018/0238441 A1   Aug. 23, 2018

Related U.S. Application Data

(63) Continuation of application No. PCT/EP2016/068324, filed on Aug. 1, 2016.

(30) Foreign Application Priority Data

Aug. 6, 2015  (DE) .................... 10 2015 112 920

(51) Int. Cl.
*H02H 1/00*     (2006.01)
*B60K 23/04*    (2006.01)
(Continued)

(52) U.S. Cl.
CPC ............. *F16H 59/72* (2013.01); *B60K 23/04* (2013.01); *F15B 19/005* (2013.01); *H02H 1/00* (2013.01);
(Continued)

(58) Field of Classification Search
CPC ...... H02P 1/00; H02P 1/04; H02P 1/46; H02P 6/002; H02P 21/00; H02P 25/021;
(Continued)

(56) References Cited

U.S. PATENT DOCUMENTS

| 4,897,584 A | 1/1990 | Grutzmacher et al. |
| 6,929,396 B2 * | 8/2005 | Gramsamer ............. G01K 1/14 318/473 |

(Continued)

FOREIGN PATENT DOCUMENTS

| DE | 3706659 A | 9/1988 |
| DE | 10119201 A | 10/2002 |

(Continued)

OTHER PUBLICATIONS

English Translation of the International Preliminary Report on Patentability dated Oct. 14, 2016; 7 pages.

(Continued)

*Primary Examiner* — Antony M Paul
(74) *Attorney, Agent, or Firm* — Reising Ethington, P.C.

(57) ABSTRACT

A transmission arrangement for a motor vehicle comprises a control device, a machine power electronics system, and an electric machine. The electric machine includes a plurality of windings which are connected to the machine power electronics system via particular phase conductors. The machine power electronics system is connected to the control device. The control device includes a temperature detection portion which is connected to at least one phase conductor and is designed for feeding an excitation signal into the phase conductor. The temperature detection portion is designed for capturing a response signal in the phase conductor, and from the response signal, deriving a winding temperature of the winding assigned to the phase conductor.

10 Claims, 2 Drawing Sheets

(51) Int. Cl.
*H02P 29/64* (2016.01)
*F15B 19/00* (2006.01)
*F16H 59/72* (2006.01)
*H02K 11/00* (2016.01)

(52) U.S. Cl.
CPC .............. *H02K 11/00* (2013.01); *H02P 29/64* (2016.02); *F15B 2211/20515* (2013.01); *F15B 2211/66* (2013.01); *F16D 2500/3028* (2013.01)

(58) Field of Classification Search
CPC .......... H02P 25/08; H02P 27/04; H02P 27/06; H02P 29/0044; H02P 29/0072; H02P 29/0055; H02P 29/005; H02P 27/00; H02P 3/00; H02P 7/00; G05B 5/00; G05D 23/00; H02H 7/08
USPC .......... 318/471, 472, 400.01, 700, 701, 727, 318/800, 801, 430; 361/23, 30
See application file for complete search history.

(56) References Cited

U.S. PATENT DOCUMENTS

| | | | | |
|---|---|---|---|---|
| 7,211,913 B2* | 5/2007 | Tsutsui | ...................... | B60K 6/48 310/52 |
| 8,244,427 B2* | 8/2012 | Weiss | ...................... | G01K 15/00 701/29.7 |
| 9,815,456 B2* | 11/2017 | Wu | ...................... | B60W 20/50 |
| 2004/0080333 A1 | 4/2004 | Klein | | |
| 2010/0155192 A1 | 6/2010 | Kohlbock | | |
| 2014/0050592 A1 | 2/2014 | Kiehlneker | | |
| 2015/0263653 A1* | 9/2015 | Minato | ...................... | H02P 6/28 318/400.09 |

FOREIGN PATENT DOCUMENTS

DE  102008000784 A  9/2009
DE  102012016591 A  2/2014

OTHER PUBLICATIONS

International Search Report for Application No. PCT/EP2016/068324 dated Oct. 14, 2016; 8 pages.

* cited by examiner

TRANSMISSION ARRANGEMENT AND ELECTRIC MACHINE FOR MOTOR VEHICLE AND TEMPERATURE DETECTION METHOD THEREFOR

CROSS REFERENCES TO RELATED APPLICATIONS

This is a Continuation application of international patent application PCT/EP2016/068324, filed Aug. 1, 2016, which claims the priority of German patent application 10 2015 112 920.5, filed Aug. 6, 2015, the entire content of both of these applications is hereby incorporated by reference.

BACKGROUND

The present invention relates to a transmission arrangement for a motor vehicle, wherein the transmission arrangement comprises a control device, a machine power electronics system, and an electric machine which includes a plurality of windings which are connected to the machine power electronics system via particular phase conductors, and wherein the machine power electronics system is connected to the control device.

Such a transmission arrangement further generally includes a housing, on which the electric machine is located, and in which a fluid sump, which has a fluid accommodated therein, is formed.

The present invention further relates to an electric machine arrangement for such a transmission arrangement and to a method for detecting the machine temperature of such an electric machine.

In transmission arrangements of the type utilized in drive trains of motor vehicles, electric machines can be utilized as an electric motor for providing drive power for the motor vehicle, for example in a hybrid drive train. It is also known to automate transmission arrangements of such drive trains, wherein the actuator system can include electric motors. The electric motors can be utilized, for example, either directly as actuators or as a drive for pumps of a hydraulic arrangement.

As mentioned, such transmission arrangements generally comprise a housing, within which a fluid sump is formed. With respect to the automated actuation of such transmission arrangements, it is important to know the temperature of the fluid accommodated in the fluid sump. The fluid, after all, is generally an oil, the viscosity of which depends comparatively greatly on the temperature. Consequently, depending on the temperature of the fluid, other boundary conditions can result for the control of components of the transmission arrangement, such as, for example, shift clutches or even start or separating clutches. In many cases, such hydraulic arrangements also include electric motor-driven pumps for providing cooling and/or lubricating fluid. The cooling and/or lubricating fluid can be fed, for example, to transmission components or to a wet-running multi-plate clutch.

In order to detect the temperature of the fluid, it is known to situate a temperature sensor in the fluid sump.

Such a temperature sensor is expensive, however. Furthermore, it is difficult to check the proper functioning of this fluid temperature sensor. Document DE 10 2012 016 591 A1 describes a method for determining temperature in a hydraulic arrangement, wherein the temperature of a fluid is determined on the basis of a relationship, which is specific for the hydraulic arrangement, between the speed of the electric motor and the temperature of the fluid at a predetermined pressure of the fluid.

SUMMARY

Against this background, a problem addressed by the application is that of providing an improved transmission arrangement, an improved electric machine arrangement, and an improved method for detecting a temperature, wherein preferably at least one of the aforementioned disadvantages is avoided.

The aforementioned problem may be solved, on the one hand, by a transmission arrangement for a motor vehicle, comprising a control device, a machine power electronics system, and an electric machine having a plurality of windings which are connected to the machine power electronics system via particular phase conductors, wherein the machine power electronics system is connected to the control device, and wherein the control device includes a temperature detection portion which is connected to at least one phase conductor and is designed for feeding an excitation signal into the phase conductor, and wherein the temperature detection portion is designed for capturing a response signal in the phase conductor, and from the response signal, deriving a winding temperature of the winding assigned to the phase conductor.

The aforementioned problem may be further solved by an electric machine arrangement, in particular for a transmission arrangement of the above-described type, comprising a control device, a machine power electronics system, and an electric machine having a plurality of windings which are connected to the machine power electronics system via particular phase conductors, wherein the machine power electronics system is connected to the control device, and wherein the control device includes a temperature detection portion which is connected to a phase conductor and is designed for outputting a voltage pulse to the phase conductor and capturing a current pulse response, wherein the temperature detection portion is further designed for deriving, from the current pulse response, a machine temperature of the electric machine.

Finally, the aforementioned problem may be solved by a method for detecting the machine temperature of an electric machine for a transmission arrangement of a motor vehicle, in particular an electric machine of a machine arrangement of the above-described type, wherein the electric machine comprises at least one winding connected to a phase conductor, including the steps of feeding an excitation signal into the phase conductor, capturing a response signal on the phase conductor, and calculating the machine temperature from the response signal.

According to the application, the machine temperature can be detected in an easy way. The machine temperature can be equal to the winding temperature. The windings can be, in particular, stator windings. The electric machine can be, in particular, a direct current machine, the rotor of which comprises permanent magnets.

The detection method according to the application is based on the fact that the ohmic resistance of the winding is temperature-dependent.

In the case of an electric machine comprising multiple windings which are situated, in particular, so as to be distributed around the circumference of the electric machine, it is particularly preferred when an excitation signal is fed only into one of the phase conductors. As a result, it can be prevented that the electric machine starts due to the excitation signal. The method according to the application is utilized, in particular, during a standstill of the electric machine. As a result, it can be prevented that the detection of the response signal is invalidated, for example, due to magnetic induction.

The excitation signal is, in particular, a short voltage pulse, and the response signal is, in particular, a current pulse response.

The electric machine can be a drive unit for a motor vehicle, which can be operated as an electric motor or as a generator. The electric machine can also be an actuator motor, however, which is utilized, for example, for actuating shift clutches, or for driving a pump of a hydraulic arrangement.

Furthermore, the electric machine can be designed as an auxiliary drive motor for units such as pumps, window lifters, etc. The control device is preferably a transmission control unit.

The control device preferably comprises a memory including a table, in which different response signals are stored in relation to certain winding and machine temperatures. Alternatively, it is also possible that the control device mathematically analyzes the particular captured response signal, for example with respect to the slope of the response signal in certain time intervals. On the basis of such a mathematical analysis, a winding or machine temperature can then preferably likewise be derived.

The problem is therefore completely solved.

With respect to the transmission arrangement according to the application, it is particularly preferred when the transmission arrangement comprises a housing, on which the electric machine is located and in which a fluid sump, which has a fluid accommodated therein, is formed.

In this embodiment, the temperature of a housing of the electric machine can correspond to the temperature of the housing of the transmission arrangement. The temperature of the housing of the transmission arrangement generally corresponds to the temperature of the fluid accommodated in the fluid sump. Consequently, the fluid temperature can be inferred from the machine temperature.

The electric machine can be located externally on the housing of the transmission arrangement in this case, although the electric machine is preferably located within the housing of the transmission arrangement.

With respect to the detection method according to the application, it is particularly preferred when the steps of feeding the excitation signal, capturing the response signal, and calculating the machine temperature are carried out when the electric machine has not been energized for the purpose of providing drive power for a predetermined period of time.

As a result, it can be achieved that the temperature of the electric machine has essentially adapted to the temperature of the housing. The temperature of the winding of the electric machine and the temperature of the housing of the electric machine are also equalized in this case. During an energization of the electric machine in order to provide drive power, however, the winding temperature could have increased due to internal losses, and therefore a correlation between the winding temperature and the fluid temperature is not possible.

Due to the above-described measures, it can be preferably possible, however, to detect the temperature of the fluid in the transmission arrangement via an excitation of the electric machine. Considerable cost reductions can be achieved as a result. Mechanical influences can be preferably avoided as a result, in particular when the excitation signal is applied to only one phase conductor, and therefore no commutation takes place, since the electric machine then preferably does not move and does not invalidate the measured value.

In the case of the transmission arrangement according to the application, it is further advantageous in this case when a temperature sensor for measuring the fluid temperature of the fluid is connected to the control device.

Due to this measure, it is possible to detect the fluid temperature with the aid of two independent measuring methods, namely, on the one hand, via the temperature sensor and, on the other hand, by way of the feeding of the excitation signal and the evaluation of a response signal on the phase conductor. As a result, the fluid temperature can be reliably detected with elevated redundancy.

According to yet another preferred embodiment, the control device comprises a comparator unit which compares the winding temperature and the fluid temperature.

As a result, it is also possible, for example, to check the function or operability of the temperature sensor.

Thus, a method for checking the function of a temperature sensor includes the use of the above-described detection method, wherein the calculated machine temperature is compared with the temperature measured by the temperature sensor, in order to check the function of the temperature sensor.

As mentioned above, the detection method according to the application preferably takes place in a transmission arrangement and, specifically, preferably during a standstill of the electric machine, wherein the electric machine has preferably not been energized for the purpose of providing drive power for a predetermined period of time, and therefore it can be assumed that the temperature of the electric machine, overall, has adapted to the temperature within the transmission arrangement and, consequently, correlates with the temperature of the fluid. In other words, the winding temperature preferably reflects the temperature in the fluid sump, at least when the motor has not been energized for a relatively long time.

From document DE 37 06 659 A1, it is known to allow the determination of the ohmic winding resistance to take place, while the motor is running, by performing a measurement during a period of time, in which the winding is in the currentless state. The temperature of the winding is to be detected as a result. In the present application, however, the approach is preferably that of detecting or deriving the machine temperature from the winding temperature, whereupon, from the machine temperature, the temperature of a surroundings of the electric machine can then be derived, for example the temperature of a fluid in a fluid sump of a transmission arrangement.

The period of time for which the electric machine is preferably not energized, in order to carry out the method, is preferably 10 seconds, in particular 30 seconds, particularly preferably 60 seconds and, in particular, 2 minutes.

It is understood that the features mentioned above and which are described below may be used not only in the combination described, but also in other combinations or alone, without leaving the scope of the present invention.

BRIEF DESCRIPTION OF THE SEVERAL VIEWS OF THE DRAWING

Exemplary embodiments of the invention are represented in the drawings and are described in greater detail in the description which follows, in which.

EMBODIMENTS

Figure 1A:
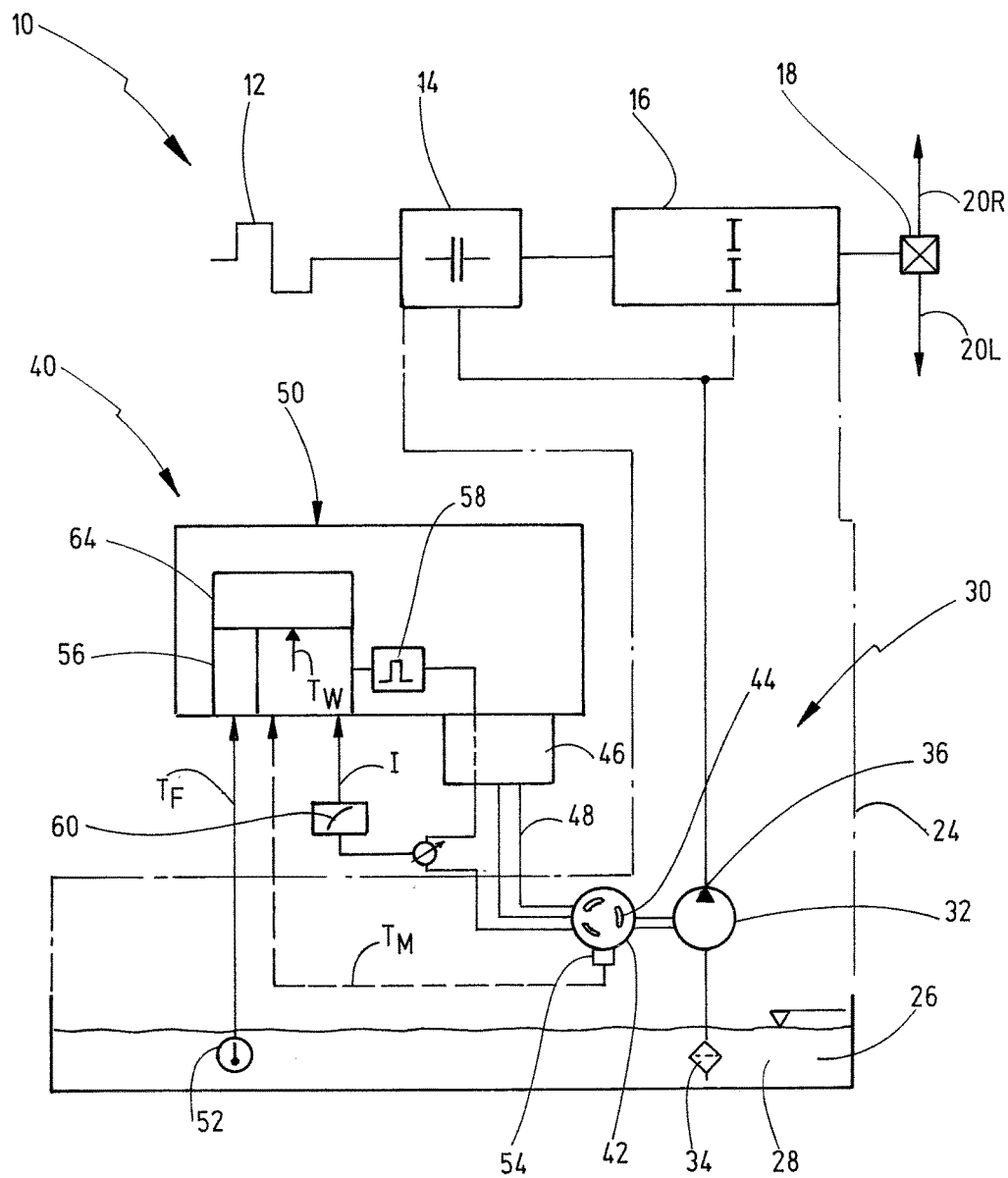
FIG. 1A shows a schematic representation of a drive train of a motor vehicle comprising one embodiment of a transmission arrangement and one embodiment of an electric machine arrangement.

In FIG. 1A, a drive train for a motor vehicle is schematically represented and is labeled in general with 10.

The drive train 10 comprises a drive motor 12, such as an internal combustion engine, the drive shaft of which is connected to the input of a clutch arrangement 14. The clutch arrangement 14 can be a simple start and separating clutch, although it can also comprise a double clutch. The clutch arrangement 14 is connected on its output side to a transmission arrangement 16. The transmission arrangement 16 can comprise a transmission having a spur-gear design, in particular in the form of a layshaft transmission. The clutch arrangement 14 and the transmission arrangement 16 can also be formed by a converter-automatic transmission, to name one example.

One output of the transmission arrangement 16 is connected to a differential 18, by means of which drive power can be distributed to driven wheels 20L, 20R of the motor vehicle.

The clutch arrangement 14 and the transmission arrangement 16 comprise a housing 24, within which a fluid sump 26 for accommodating a fluid 28 is formed. The fluid 28 can be, for example, an oil, such as an ATF oil.

The housing 24 can be subdivided into a clutch housing and into a transmission housing, wherein the fluid sump 26 can be assigned to the clutch housing, to the transmission housing, or to both.

The drive train 10 further comprises a hydraulic arrangement 30. The hydraulic arrangement 30 comprises a pump 32 which draws the fluid 28 out of the fluid sump 26, specifically preferably via a fluid filter 34 and a suction connection of the pump 32, which is not described in greater detail. A pressure connection 36 of the pump can be connected either to one or to multiple piston/cylinder arrangements, in order to actuate components of the drive train 10. The pressure connection 36 can also be connected to a lubrication and/or cooling fluid line, however, which provides fluid 28 to the clutch arrangement 14 for cooling and/or lubricating purposes. Furthermore, such a fluid line, which is connected to the pressure connection 36 of the pump 32, can also be connected to the transmission arrangement 16, can alternatively be connected to the clutch arrangement 14 or, can additionally be connected to the clutch arrangement 14. In this case, the fluid 28 can be used, for example, for lubricating transmission components such as bearings, gears, etc.

The clutch arrangement 14 and the transmission arrangement 16 can be provided as separate components. The clutch arrangement 14 can also be integrated into the transmission arrangement 16, however.

The transmission arrangement 16 (and/or the clutch arrangement 14) comprises an electric machine arrangement 40 which includes an electric machine 42. The electric machine 42 is preferably designed as a brushless, direct current motor, wherein a rotor of the electric machine 42 (not represented) is equipped with permanent magnets. The electric machine 42 further comprises a plurality of windings 42, which are distributed around the circumference, in the form of stator windings which are connected, specifically via particular phase conductors 48, to a machine power electronics system 46 for controlling the electric machine 42.

The machine power electronics system 46 comprises power semiconductor components such as thyristors, transistors, or the like, and is controlled by a control device 50 which controls the power semiconductor components in a way which is known to those of ordinary skill in the art.

The electric machine arrangement 40 can be used as a drive motor in many cases, in which case the drive train 10 is designed as a hybrid drive train. The electric machine arrangement 40 can also be designed as an auxiliary drive, however, in order to drive other components of the drive train, such as, for example, shift clutches, or window lifters, or the like. In the present case, the electric machine arrangement 40 is part of the hydraulic arrangement 30, wherein the electric machine 42 is used for driving the pump 32. Consequently, the pump 32 can be driven by means of the control device 50 as needed, in order to provide fluid at the pressure connection 36 as needed, whether it be for purposes of cooling, lubrication, or actuation.

The electric machine 42 is preferably accommodated within the housing 24 in such a way that a housing of the electric machine 42 is thermally conductively connected to the housing 24. In many cases, the housing 24 can also form a housing of the electric machine 42.

The windings 44 are wound onto the housing of the electric machine. This takes place in such a way that the temperature of the windings essentially corresponds to the temperature of the housing of the electric machine 42, at least in the stationary state. Provided the machine housing is thermally conductively connected to the housing 24, the winding temperature of the windings 44 consequently essentially corresponds to the temperature of the housing 24, at least in a stationary state.

The fluid 28, which generally heats up during operation of the drive train 10, is accommodated in the housing 24. A typical nominal operating temperature of the fluid 28 is in the range, for example, of 60° C. to 120° C.

In the stationary state, the temperature of the fluid 28 consequently also largely corresponds to the temperature of the housing 24, specifically at such points at which the housing 24 internally comes into contact with the fluid 28, whether it is in the region of the fluid sump 26 or in a region in which splashed fluid splashes onto an inner wall of the housing 24, such as, for example, within the housing of the transmission arrangement 16. The splashed oil can be generated, for example, by gears or the like dipping into the oil sump 26. The splashed oil can also be radially outwardly splashing fluid which is fed, for example, to the clutch arrangement 14 by means of an injection lubrication.

The mode of operation of the hydraulic arrangement 30 depends on the temperature of the fluid 28, since the viscosity of the fluid greatly depends on the temperature.

An actuation of the pump 32, for example, therefore preferably takes place in the control device 50 according to the temperature of the fluid 28.

For this purpose, the control device 50 can be connected to an optional fluid temperature sensor 52, the sensor element of which is situated, for example, in the fluid 28. The fluid temperature sensor 52 directly detects the temperature $T_F$ of the fluid 28.

Furthermore, the electric machine 42 can comprise a machine temperature sensor 54 which detects the machine temperature $T_M$ and transmits said temperature to the control device 50. Such a machine temperature sensor 54 is optional, as indicated by way of the dashed line.

Furthermore, the electric machine arrangement 40, which comprises the electric machine 42, the machine power electronics system 46, and—at least partially—the control device 50, is capable of indirectly detecting the temperature of the fluid 28, specifically via a sensorless temperature detection making use of the temperature dependence of the ohmic resistance of at least one winding 44.

This further temperature measurement can either be utilized, in this case, for replacing the fluid temperature sensor 52 or for checking the mode of operation thereof.

More specifically, the control device 50 comprises a temperature detection portion 56, by means of which an excitation signal 58, for example in the form of an electric voltage pulse, can be output to one of the phase conductors 48. Since such an excitation signal 58 is applied to preferably only one of the phase conductors 48 and, consequently, to only one of the windings 44, this generally does not result in a start of the electric machine 42.

The feeding of the excitation signal 58 into a phase conductor 48 preferably takes place in an idle state of the electric machine arrangement 40, i.e., preferably when the electric machine has not been energized for the purpose of providing drive power for a predetermined period of time.

In this type of idle state, it can be approximately assumed that the winding temperature of the winding 44 has adapted to the temperature of the fluid 28 or correlates therewith. Due to the idle state and the thermally conductive connection between the fluid 28, the housing 24, and the housing of the electric machine 42, such a correlation or match can be assumed after the predetermined period of time.

The temperature detection portion 56 is further designed for capturing a response signal 60 on the same phase conductor 48, specifically in the form of a pulse response of the electric current in the phase conductor 48.

The temperature of the winding 44 can then be determined from the pulse current response.

Figure 1B:
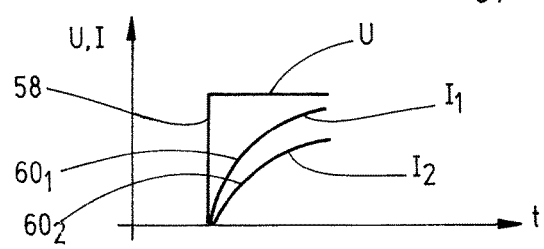
FIG. 1B shows a time flow chart of an exemplary excitation signal and of exemplary response signals during the implementation of a detection method.

This can take place, for example, as represented in FIG. 1B. FIG. 1B is a time flow chart of voltage and current in the phase conductor 48 over time. An excitation signal in the form of a voltage pulse is shown at 58. A first response signal in the form of a current progression $I_1$ is shown as $60_1$. A second response signal in the form of a second electric current progression $I_2$ is shown as $60_2$. The different response signals $60_1$, $60_2$ infer different temperatures of the winding 44. The determination of the winding temperature is furthermore a function of the material of the winding or the phase conductor, i.e., for example copper or another electrically conductive material.

A table can be stored in the temperature detection portion 56 of the control device 50, which compares certain current pulse responses $I_1$, $I_2$, etc., with previously stored current pulse responses, in order to be able to infer a temperature of the winding 44. The temperature detection portion 56 can also comprise a calculation portion, however, which calculates a temperature of the winding 44 from the particular response signal $60_1$, $60_2$.

Figure 2:
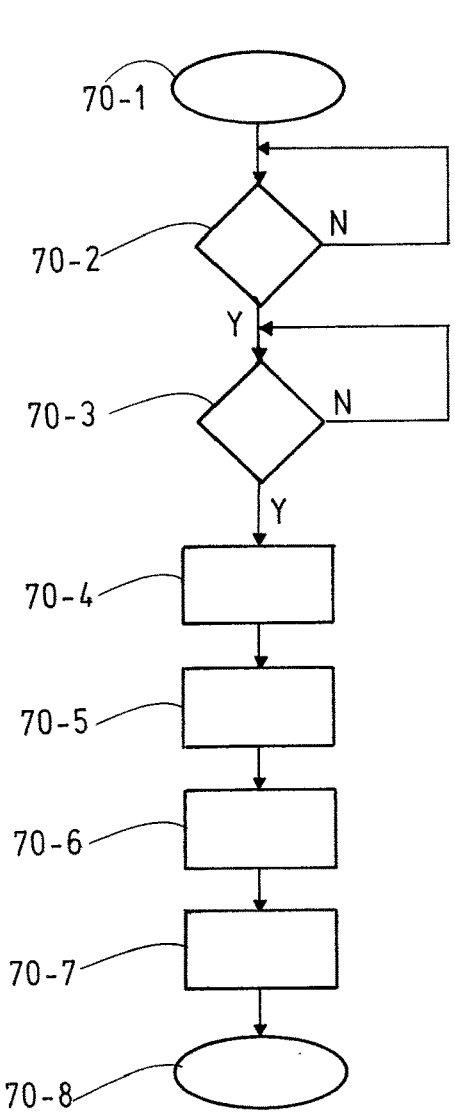
FIG. 2 shows an exemplary flow chart of a detection method.

FIG. 2 shows a flow chart comprising one exemplary embodiment of a method for detecting the machine temperature of an electric machine, which is applied, in particular, within the environment of a drive train for a motor vehicle or a transmission arrangement.

The method 70 shown in FIG. 2 includes a start step 70-1. The start step is followed by a query step 70-2, by way of which it is queried whether the machine temperature is to be detected. If no (N), the program returns to the beginning. If yes (Y), the next query takes place in the following step 70-3, namely whether the electric machine has not been energized for the purpose of providing drive power for a predetermined period of time. When this is not the case (N), i.e., when an energization of the electric machine took place within the predetermined period of time, the method returns to the beginning of the step 70-3. When no energization of the electric machine took place for a relatively long time (Y), however, the method skips to the step 70-4. In the step 70-4, an excitation signal 58 is output to a phase conductor 48. In the following step 70-5, a response signal 60 is detected on the same phase conductor.

In the step 70-6, an evaluation of the response signal and a calculation of the machine temperature from the response signal takes place, wherein the calculation can include calculation steps or merely reading from a table.

In the step 70-7, the determined machine temperature is output. In the step 70-8, the program 70 comes to an end.

Figure 3:
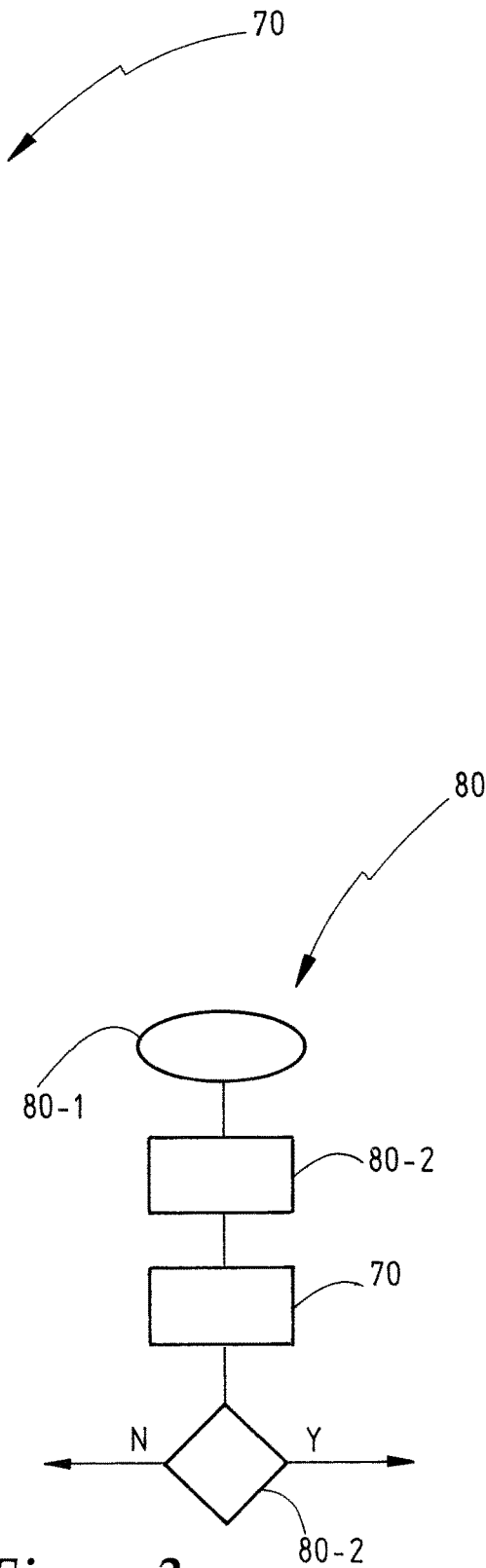
FIG. 3 shows an exemplary flow chart of a method for checking the temperature of a temperature sensor.

FIG. 3 shows a flow chart of a method for checking the function of a temperature sensor.

The method 80 shown in FIG. 3 includes a start step 80-1, after which, in a step 80-2, the temperature is initially measured by means of a temperature sensor.

In the following step 70, the method according to FIG. 2 is carried out, which results in the machine temperature.

In the step 80-2, the machine temperature that was determined in the method 70 and the temperature measured by the temperature sensor are compared with each other, in order to check the function of the temperature sensor. Consequently, the result of the query of the step 80-2 is either a proper performance of the temperature sensor (Y) or a fault in the temperature sensor (N).

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A transmission arrangement for a motor vehicle, comprising:
a control device,
a machine power electronics system, and an electric machine which includes a plurality of windings which are connected to the machine power electronics system via particular phase conductors, wherein the machine power electronics system is connected to the control device, wherein the control device includes a temperature detection portion which is connected to at least one of the phase conductors and is designed for feeding an excitation pulse signal into the at least one phase conductor, and wherein the temperature detection portion is designed for capturing a current pulse response signal in the at least one phase conductor, and from the current pulse response signal, deriving a winding temperature of the winding assigned to the at least one phase conductor.

2. The transmission arrangement as claimed in claim 1, further comprising a housing, on which the electric machine is located and in which a fluid sump, which has a fluid accommodated therein, is formed.

3. The transmission arrangement as claimed in claim 2, wherein a temperature sensor is connected to the control device for measuring a fluid temperature of the fluid.

4. The transmission arrangement as claimed in claim 2, wherein the control device comprises a comparator unit which compares the winding temperature and a fluid temperature.

5. The transmission arrangement as claimed in claim 1, wherein the temperature detection portion is configured to derive the winding temperature of the winding assigned to the at least one phase conductor when the electric machine has not been energized for the purpose of providing drive power for a predetermined period of time.

6. An electric machine arrangement, comprising:
   a control device,
   a machine power electronics system, and
   an electric machine which includes a plurality of windings which are connected to the machine power electronics system via particular phase conductors, wherein the machine power electronics system is connected to the control device, wherein the control device includes a temperature detection portion which is connected to one of the phase conductors and is designed for outputting a voltage pulse to the one phase conductor and capturing a current pulse response, and wherein the temperature detection portion is designed for deriving, from the current pulse response, a machine temperature of the electric machine.

7. The electric machine arrangement as claimed in claim 6, wherein the temperature detection portion is configured to derive the machine temperature of the electric machine when the electric machine has not been energized for the purpose of providing drive power for a predetermined period of time.

8. A method for detecting the machine temperature of an electric machine for a transmission arrangement of a motor vehicle, wherein the electric machine comprises at least one winding connected to a phase conductor, the method including the steps:
   a) feeding an excitation pulse signal into the phase conductor,
   b) detecting a current pulse response signal on the phase conductor; and
   c) calculating the machine temperature from the current pulse response signal.

9. The method as claimed in claim 8, wherein the steps a) to c) are carried out when the electric machine has not been energized for the purpose of providing drive power for a predetermined period of time.

10. The method as claimed in claim 8, further comprising the step:
    comparing the calculated machine temperature with a temperature measured by a temperature sensor, in order to check the function of the temperature sensor.

* * * * *